US011445151B2

United States Patent
Miyazawa

(10) Patent No.: US 11,445,151 B2
(45) Date of Patent: Sep. 13, 2022

(54) VEHICLE ELECTRONIC MIRROR SYSTEM

(71) Applicant: TOYOTA JIDOSHA KABUSHIKI KAISHA, Aichi-ken (JP)

(72) Inventor: Tsuyoshi Miyazawa, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 47 days.

(21) Appl. No.: 17/159,153

(22) Filed: Jan. 27, 2021

(65) Prior Publication Data
US 2021/0266502 A1    Aug. 26, 2021

(30) Foreign Application Priority Data

Feb. 21, 2020   (JP) .............................. JP2020-028628

(51) Int. Cl.
*H04N 7/18* (2006.01)
*H04N 5/225* (2006.01)
(Continued)

(52) U.S. Cl.
CPC ............... *H04N 7/183* (2013.01); *B60R 1/04* (2013.01); *B60R 1/12* (2013.01); *B60R 11/04* (2013.01); *G06V 10/40* (2022.01); *H04N 5/22525* (2018.08); *B60R 2001/1253* (2013.01); *B60R 2011/0003* (2013.01); *B60R 2300/207* (2013.01)

(58) Field of Classification Search
CPC ...... H04N 7/183; H04N 5/22525; H04N 7/18; B60R 1/04; B60R 1/12; B60R 11/04; B60R 2001/1253; B60R 2011/0003; B60R 2300/207; B60R 2300/307; B60R 2300/605; B60R 2300/8066; B60R 1/00; (Continued)

(56) References Cited

U.S. PATENT DOCUMENTS

| 10,360,663 B1 * | 7/2019 | Dottel ..................... G06T 5/002 |
| 2011/0074957 A1 * | 3/2011 | Kiyohara ............. G06V 10/267 348/148 |

(Continued)

FOREIGN PATENT DOCUMENTS

| JP | H11259634 A | 9/1999 |
| JP | 200827138 A | 2/2008 |

(Continued)

*Primary Examiner* — Sath V Perungavoor
*Assistant Examiner* — Tyler B Edwards
(74) *Attorney, Agent, or Firm* — Hauptman Ham, LLP

(57) ABSTRACT

A vehicle electronic mirror system including: a rearward image capture section configured to capture a rearward video image from a vehicle; a video image processing section including: a computation section configured to extract a feature point in the rearward video image and to compute an optical flow direction of the feature point, a determination section configured to determine whether or not the optical flow direction of the feature point is heading toward a point-at-infinity side in the rearward video image, and a processed video image generation section configured to generate a processed video image in which visibility of a region in the rearward video image corresponding to a feature point heading toward the point-at-infinity side is reduced relative to a visibility of other regions in the rearward video image; and a display device configured to display the processed video image toward an occupant.

6 Claims, 11 Drawing Sheets

(51) Int. Cl.
  *G06K 9/46*    (2006.01)
  *B60R 1/12*    (2006.01)
  *B60R 11/04*   (2006.01)
  *B60R 1/04*    (2006.01)
  *G06V 10/40*   (2022.01)
  *B60R 11/00*   (2006.01)

(58) Field of Classification Search
  CPC ........ B60R 2001/1215; B60R 2300/30; G06V 10/40; G06V 20/58; G06T 11/00
  See application file for complete search history.

(56) References Cited

U.S. PATENT DOCUMENTS

| | | | |
|---|---|---|---|
| 2014/0313339 A1* | 10/2014 | Diessner | G02B 3/14 348/148 |
| 2018/0032082 A1* | 2/2018 | Shalev-Shwartz | G01C 21/3602 |
| 2019/0291728 A1* | 9/2019 | Shalev-Shwartz | B60W 10/06 |

FOREIGN PATENT DOCUMENTS

| JP | 2010146478 A | 7/2010 |
|---|---|---|
| JP | 2017212480 A | 11/2017 |

* cited by examiner

VEHICLE ELECTRONIC MIRROR SYSTEM

CROSS-REFERENCE TO RELATED APPLICATION

This application claims priority under 35 USC 119 from Japanese Patent Application No. 2020-028628, filed on Feb. 21, 2020, the disclosure of which is incorporated by reference herein.

BACKGROUND

Technical Field

The present disclosure relates to a vehicle electronic mirror system.

Related Art

Japanese Patent Application Laid-Open (JP-A) No. 2017-212480 discloses a technology relating to an electronic mirror device. In this electronic mirror device, in a video image captured by an image capture device that captures images rearward from a vehicle, masking processing is performed in a region of the video image corresponding to a position close to the vehicle itself. Namely, flow within the video image, i.e. optical flow, is faster in the region of the video image corresponding to the position close to the vehicle itself, and so there is a possibility that an occupant looking at the video image might be distracted by this fast optical flow and be slow to notice other vehicles or the like that appear in the video image. Accordingly, performing masking processing at positions in the video image close to the vehicle itself enables the occupant looking at the video image to be suppressed from being distracted by the fast optical flow.

In an electronic mirror device for the occupant, although it is desirable to display a video image corresponding to a broad range rearward from the vehicle, displaying such a video image with a broad range could cause an occupant to be distracted by streaming of optical flow, even at locations that do not correspond to positions close to the vehicle itself, which may annoy the occupant. There is accordingly room for improvement in the technology described above in this respect.

SUMMARY

The present disclosure provides a vehicle electronic mirror system that may increase a range that can be seen by an occupant and that may alleviate the burden on the occupant when looking.

A first aspect of the present disclosure is a vehicle electronic mirror system including: a rearward image capture section configured to capture a rearward video image from a vehicle; a video image processing section including: a computation section configured to extract a feature point in the rearward video image and to compute an optical flow direction of the feature point, a determination section configured to determine whether or not the optical flow direction of the feature point is heading toward a point-at-infinity side in the rearward video image, and a processed video image generation section configured to generate a processed video image in which visibility of a region in the rearward video image corresponding to a feature point heading toward the point-at-infinity side is reduced relative to a visibility of other regions in the rearward video image; and a display device configured to display the processed video image toward an occupant.

In the first aspect of the present disclosure, the video image processing section generates the processed video image based on the rearward video image captured rearward from the vehicle by the rearward image capture section, and the processed video image is displayed toward the occupant by the display device. The video image processing section includes the computation section, the determination section, and the processed video image generation section. The computation section extracts a feature point in the rearward video image and computes the optical flow direction of the feature point. The determination section determines whether or not the optical flow direction of the feature point computed by the computation section is heading toward the point-at-infinity side in the rearward video image. The processed video image generation section generates the processed video image in which the visibility of the region in the rearward video image corresponding to the feature point determined by the determination section to be heading toward the point-at-infinity side is reduced relative to visibility of the other regions in the rearward video image. Namely, a region corresponding to a feature point having an optical flow heading toward the point-at-infinity side is moving further away from the vehicle itself. On the other hand, a region corresponding to a feature point other than the feature point having an optical flow heading toward the point-at-infinity side is following or approaching the vehicle itself. Namely, the region corresponding to the feature point having an optical flow heading toward the point-at-infinity side requires less attention than the other regions, and so has a low display priority level. Reducing the visibility of the region corresponding to the feature point having an optical flow heading toward the point-at-infinity side relative to the visibility of the other regions makes streaming of the optical flow in a range having a low display priority level less noticeable. Accordingly, the first aspect of the present disclosure may enable annoyance felt when looking at the display device to be alleviated.

In a second aspect of the present disclosure, in the above first aspect, the computation section may be configured to compute a movement amount per unit time of an optical flow of the feature point; the determination section may be configured to determine whether or not the movement amount is a predetermined value or greater; and the video image processing section may be configured to generate a processed video image in which the visibility of a region in the rearward video image that corresponds to a feature point heading toward the point-at-infinity side, and that is determined to have a movement amount of the predetermined value or greater, is reduced relative to the visibility of other regions in the rearward video image.

In the second aspect of the present disclosure, the video image processing section generates the processed video image in which the visibility of the region in the rearward video image corresponding to the feature point determined by the determination section to have an optical flow direction heading toward the point-at-infinity side and also determined to have an optical flow with a movement amount per unit time of the predetermined value or greater is reduced relative to the visibility of the other regions in the rearward video image. Accordingly, the visibility is not lowered for a region corresponding to a feature point having an optical flow with a movement amount less than the predetermined value. Namely, in cases in which the movement amount of the optical flow is less than the predetermined value, since the streaming of the optical flow is comparatively slow, the streaming of the optical flow is unlikely to be distracting. Namely, the region where the movement amount of the optical flow is less than the predetermined value is unlikely to annoy the occupant when looking. Accordingly, a clear video image is displayed without reduced visibility for such a region that is unlikely to annoy the occupant when looking at the video image.

In a third aspect of the present disclosure, in the first aspect or the second aspect, the video image processing section may be configured to display a region in the rearward video image corresponding to a feature point, other than the feature point heading toward the point-at-infinity side, with emphasis relative to other regions in the rearward video image.

In the third aspect of the present disclosure, the video image processing section displays the region in the rearward video image corresponding to a feature point other than the feature point determined by the determination section to be heading toward the point-at-infinity side. Namely, the video image processing section displays a region where the vehicle itself is being followed or approached, with emphasis relative to the other regions in the rearward video image. This makes to easier for the occupant to look at a region with a high display priority level that requires more attention.

In a fourth aspect of the present disclosure, in any one of the first aspect to the third aspect, the video image processing section may be configured to make a spatial frequency of the region in the rearward video image corresponding to the feature point heading toward the point-at-infinity side a lower spatial frequency relative to the spatial frequency of the other regions in the rearward video image.

In the fourth aspect of the present disclosure, the video image processing section makes the spatial frequency of the region in the rearward video image corresponding to the feature point to be heading toward the point-at-infinity side a lower spatial frequency relative to the spatial frequency of the other regions in the rearward video image. Thus, the region in the rearward video image corresponding to the feature point determined to be heading toward the point-at-infinity side appears as a blurred video image. The streaming of the optical flow is thus made less noticeable, enabling annoyance felt when looking at the display device to be alleviated.

In a fifth aspect of the present disclosure, in any one of the first aspect to the fourth aspect, the determination section may be configured to acquire steering angle information of the vehicle and to determine whether or not the optical flow direction of the feature point is consistent with steering of the vehicle based on the steering angle information; and the video image processing section may be configured to generate the processed video image in which visibility of a region in the rearward video image corresponding to the feature point having an optical flow direction consistent with the steering of the vehicle is reduced relative to visibility of other regions.

In the fifth aspect of the present disclosure, the video image processing section generates the processed video image in which the visibility of the region in the rearward video image corresponding to the feature point determined by the determination section to have an optical flow direction consistent with the steering of the vehicle is reduced relative to visibility of the other regions. This enables the streaming of the optical flow of the region corresponding to the feature point having an optical flow direction heading in a direction other than toward the point-at-infinity side as a result of steering to be made less noticeable. Namely, a feature point having an optical flow direction heading in a direction other than toward the point-at-infinity side, but that is heading in this direction other than toward the point-at-infinity side as a result of steering, is likely to be moving away from the vehicle itself, and so has a low display priority level since less attention is required in such cases. Reducing the visibility of such a region enables the region in which the streaming of the optical flow is less noticeable to be made larger, thereby may enable the annoyance felt when looking at the display device to be further alleviated.

In a sixth aspect of the present disclosure, in any one of the first aspect to the fifth aspect, in response to operation of an operation section, the video image processing section may change a degree of reduction by which the visibility of the region in the rearward video image corresponding to the feature point heading toward the point-at-infinity side is reduced relative to the visibility of the other regions.

In the sixth aspect of the present disclosure, in response to operation of the operation section, the video image processing section changes the degree of reduction by which the visibility of the region in the rearward video image corresponding to the feature point determined by the determination section to be heading toward the point-at-infinity side is reduced relative to the visibility of the other regions. This may enable an appropriate display adapted to differences in what occupants find annoying.

In the first aspect, the vehicle electronic mirror system of the present disclosure may increase the range that can be seen by the occupant and may alleviate the burden on the occupant when looking to be achieved.

In the second aspect, the vehicle electronic mirror system of the present disclosure may improve the visibility.

In the third aspect, the vehicle electronic mirror system of the present disclosure may facilitate the acquisition of necessary information by the occupant.

In the fourth aspect, the vehicle electronic mirror system of the present disclosure may achieve both an increase in the range that can be seen by the occupant and alleviation of the burden on the occupant when looking.

In the fifth aspect, the vehicle electronic mirror system of the present disclosure may further alleviate the burden on the occupant when looking.

In the sixth aspect, the vehicle electronic mirror system of the present disclosure may further alleviate the burden on the occupant when looking.

BRIEF DESCRIPTION OF THE DRAWINGS

Exemplary embodiments will be described in detail based on the following figures, wherein.

DETAILED DESCRIPTION

First Exemplary Embodiment

Explanation follows regarding an exemplary embodiment of a vehicle electronic mirror system 10 according to the present disclosure, with reference to FIG. 1 to FIG. 8.

Figure 1:
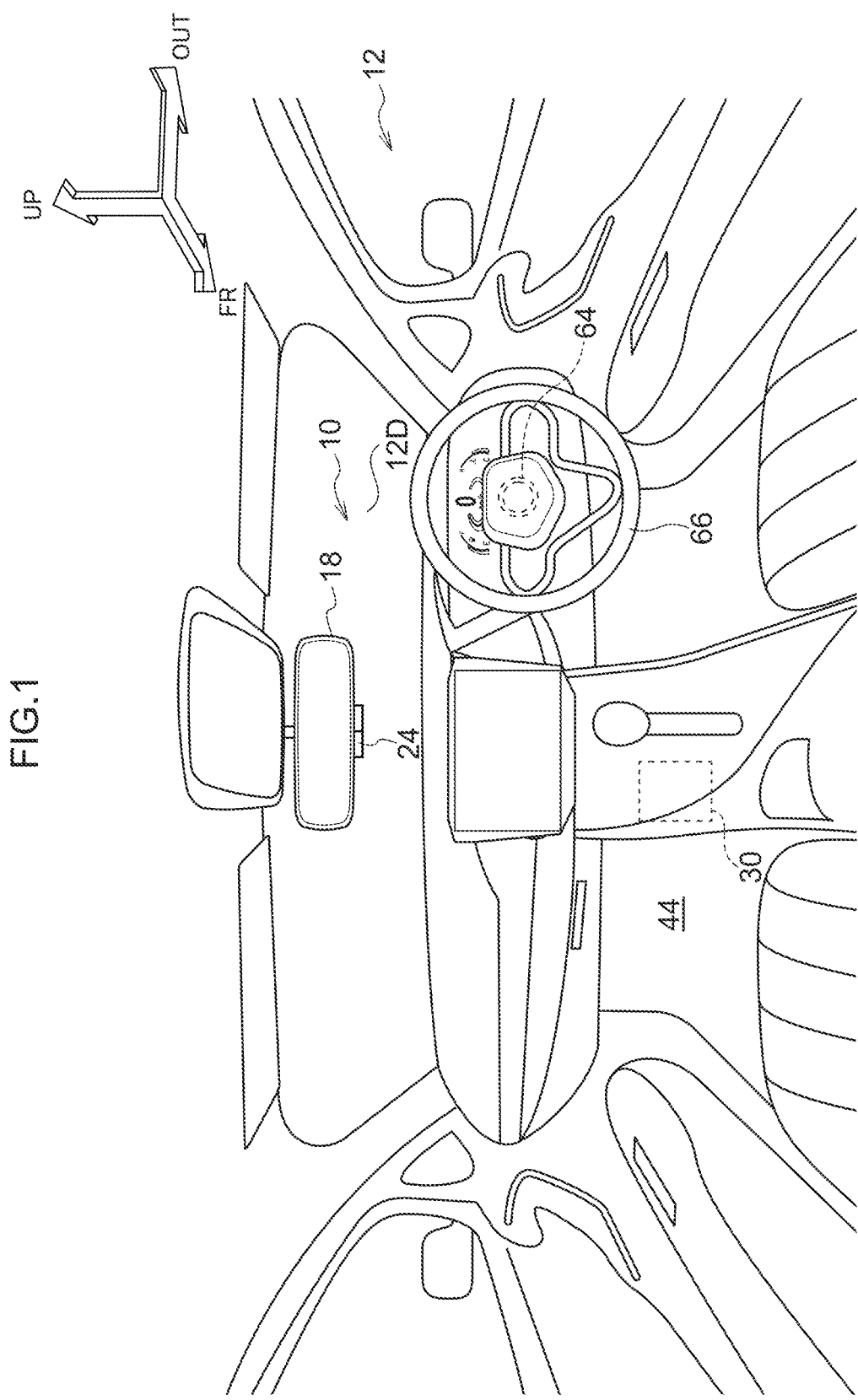
FIG. 1 is a schematic perspective view illustrating the interior of a cabin of a vehicle provided with a vehicle electronic mirror system according to a first exemplary embodiment, in a state looking toward the vehicle front side.

As illustrated in FIG. 1, the vehicle electronic mirror system 10 includes a rear camera 16 (see FIG. 2) installed in a vehicle (also referred to hereafter as the vehicle itself) 12, an electronic interior mirror 18, serving as a display device, and a display control device 20, serving as a video image processing section.

The electronic interior mirror 18 is provided at a vehicle upper side and substantially at a vehicle width direction center of a front windshield 12D. The specific configuration and operation of the electronic interior mirror 18 will be described later.

The display control device 20 is installed inside a vehicle cabin, and is connected to the rear camera 16 and the electronic interior mirror 18 to communicate with each other. Specific configuration and operation of the display control device 20 will be described later.

Figure 2:
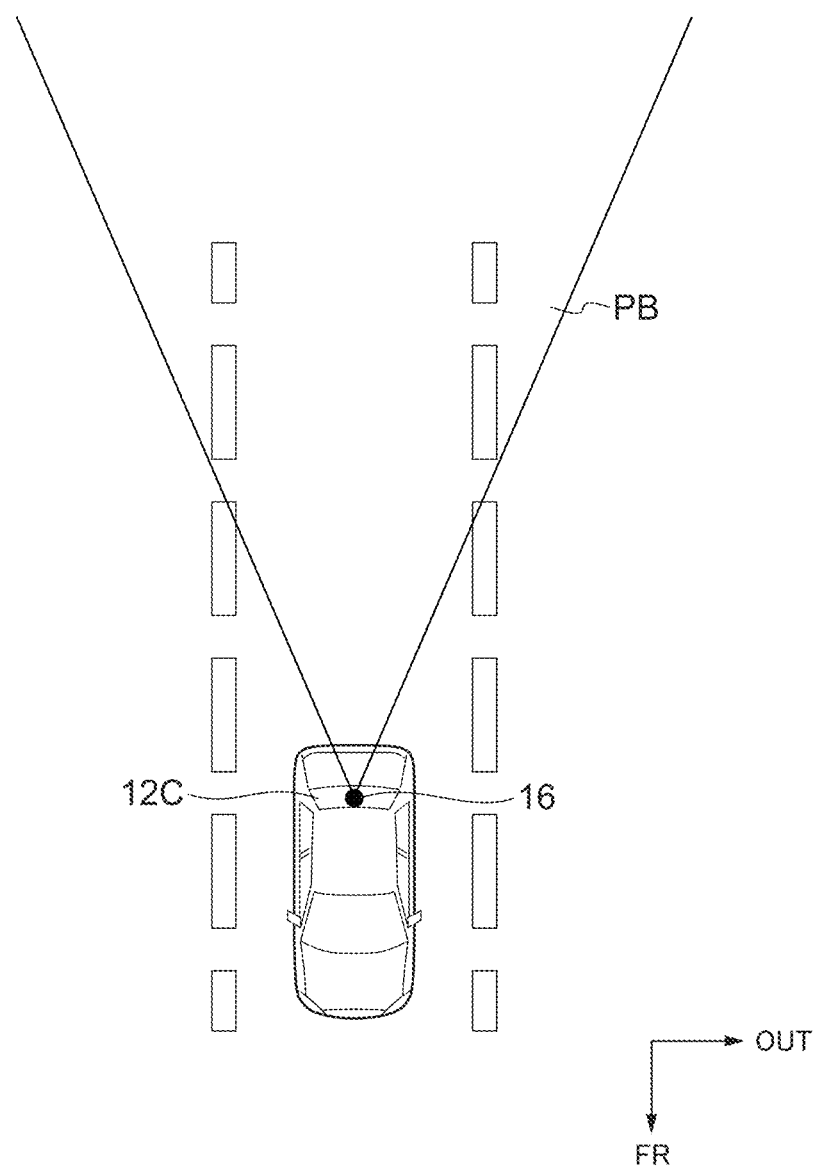
FIG. 2 is a schematic plan view illustrating an image capture range of a vehicle provided with a vehicle electronic mirror system according to the first exemplary embodiment.

As illustrated in FIG. 2, the rear camera 16 is attached inside a vehicle cabin 44 of the vehicle 12 in the vicinity of a rear windshield 12C. The imaging optical axis (lens) of the rear camera 16 faces rearward from the vehicle to image rearward from the vehicle 12 through the rear windshield 12C. Specific configuration and operation of the rear camera 16 will be described later.

Figure 7:
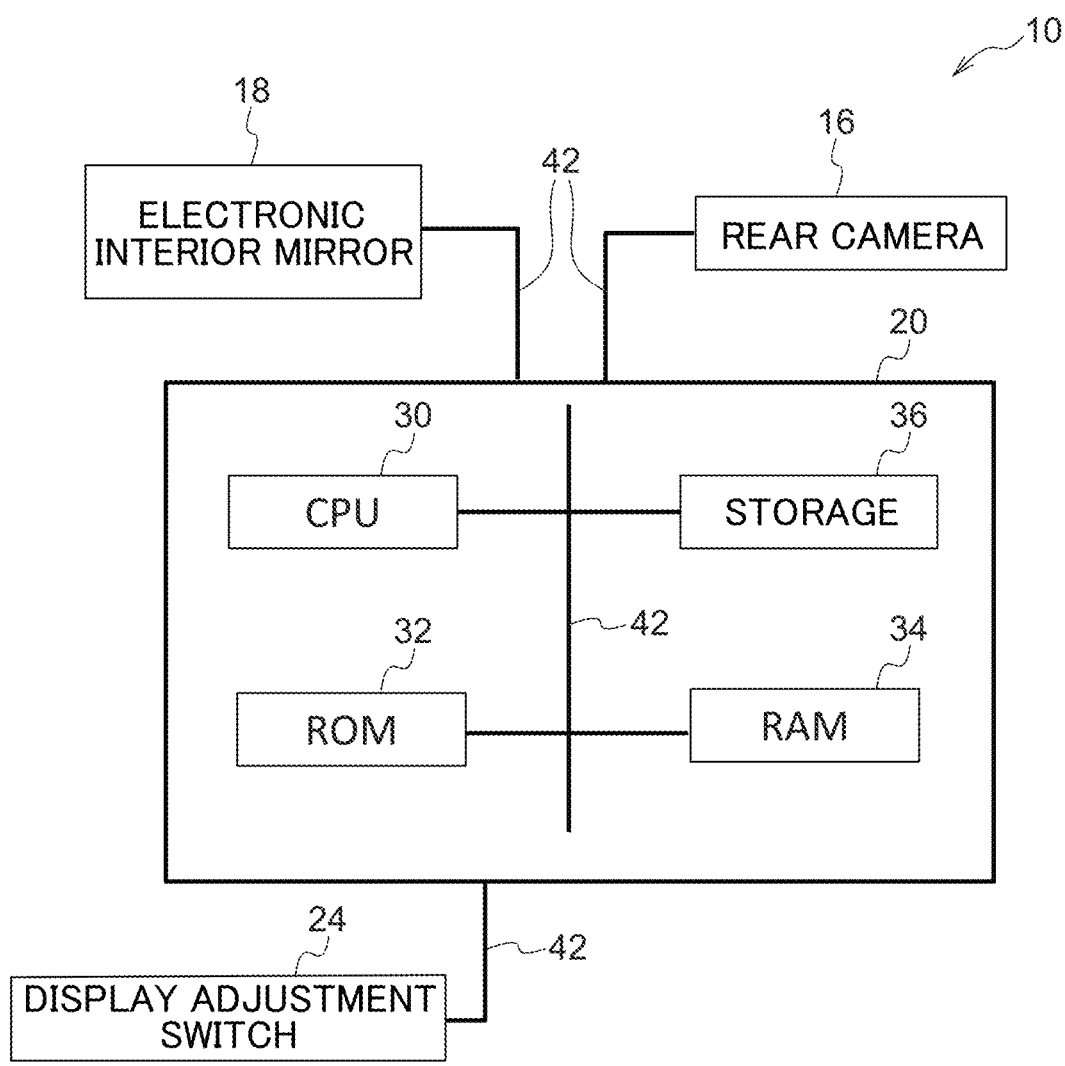
FIG. 7 is a block diagram illustrating hardware configuration of a vehicle electronic mirror system according to the first exemplary embodiment.

FIG. 7 is a block diagram illustrating hardware configuration of the vehicle electronic mirror system 10.

As illustrated in FIG. 7, the vehicle electronic mirror system 10 is configured including a central processing unit (CPU) 30, read only memory (ROM) 32, random access memory (RAM) 34, and storage 36, respectively provided inside the display control device 20, as well as the rear camera 16, the electronic interior mirror 18, and a display adjustment switch 24. The respective configurations are connected together so as to communicate with each other through a bus 42.

The CPU 30 is a central processing unit that executes various programs and controls various sections. Namely, the CPU 30 reads a program from the ROM 32 or the storage 36, and executes the program using the RAM 34 as a workspace. The CPU 30 controls the various configuration sections and performs various arithmetic processing according to programs recorded in the ROM 32 or the storage 36. In the present exemplary embodiment, a video image display program for displaying a video image on the electronic interior mirror 18 is held in the ROM 32 or the storage 36.

The ROM 32 holds various programs and various data. The RAM 34 serves as a workspace in which the programs and data are temporarily stored. The storage 36 is configured by a hard disk drive (HDD) or a solid state drive (SSD), and holds various programs and various data, including an operating system.

As an example, the rear camera 16 has no mechanism to change the direction of the imaging optical axis, and its lens has a comparatively wide view angle and a fixed focal point. The rear camera 16 thus images a fixed image capture range PB (see FIG. 2) to the rear of the vehicle 12 with a comparatively wide view angle. More specifically, in plan view of the vehicle, the image capture range PB of the rear camera 16 has a shape that comes to a point at substantially the vehicle width direction center and vehicle upper side of the rear windshield 12C (see FIG. 2) and that increases in width in the vehicle width direction on progression rearward from the vehicle.

As illustrated in FIG. 1, the electronic interior mirror 18 is configured by a liquid crystal panel capable of displaying a video image toward the inside of the vehicle cabin 44. The electronic interior mirror 18 displays a processed video image (see FIG. 6) obtained by subjecting a video image captured by the rear camera 16 (see FIG. 2) to video image processing by the display control device 20. Namely, the electronic interior mirror 18 functions as an interior mirror and side mirrors, and an occupant is able to check the rearward of the vehicle 12 by looking at the video image displayed in the electronic interior mirror 18.

As an example, the display adjustment switch 24 is provided at a lower end portion of the electronic interior mirror 18, and is a switch used to change the range and level of a low pass filter.

During execution of the video image display program, the vehicle electronic mirror system 10 employs the hardware resources described above to implement various functionality. Explanation follows regarding the functional configuration implemented by the vehicle electronic mirror system 10.

Figure 8:
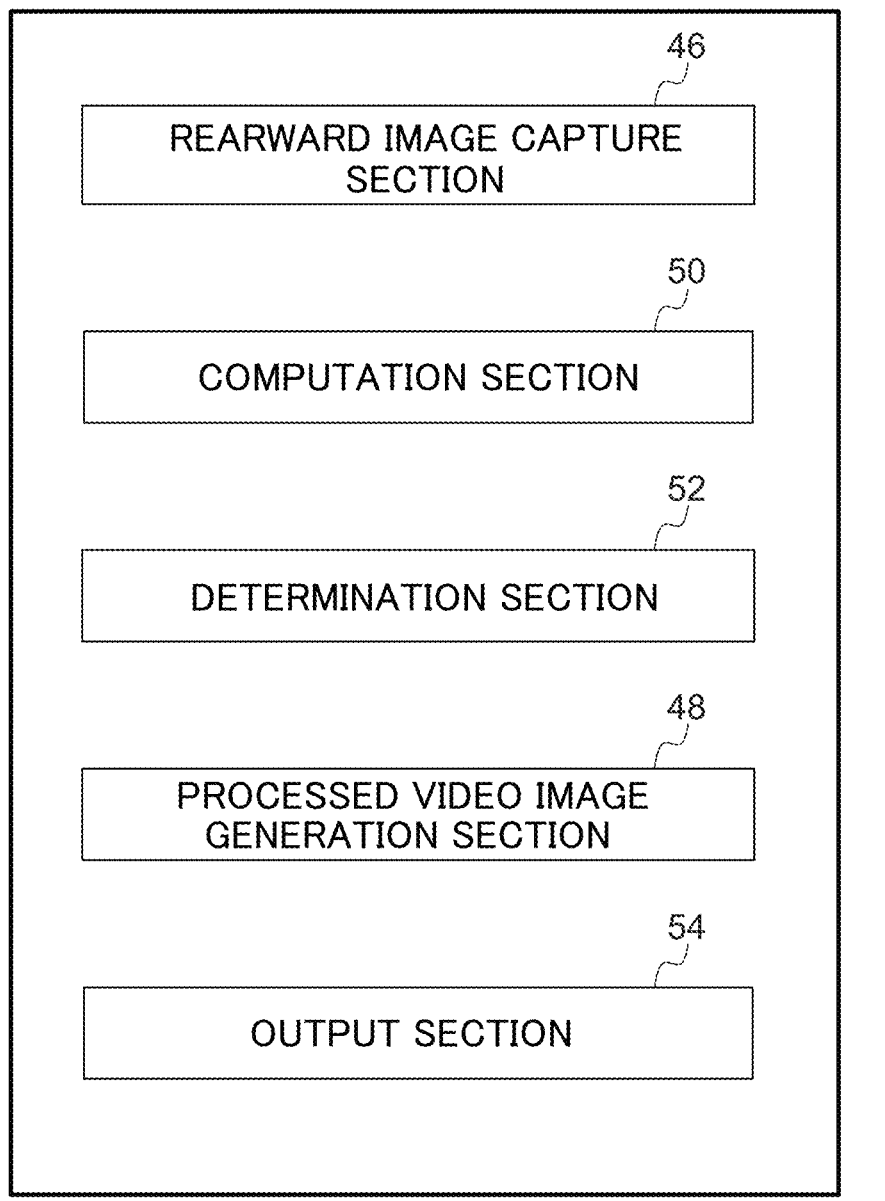
FIG. 8 is a block diagram illustrating functional configuration of a vehicle electronic mirror system according to the first exemplary embodiment.

FIG. 8 is a block diagram illustrating an example of the functional configuration of the vehicle electronic mirror system 10.

As illustrated in FIG. 8, the functional configuration of the vehicle electronic mirror system 10 includes a rearward image capture section 46, a computation section 50, a determination section 52, a processed video image generation section 48, and an output section 54. The respective functional configuration is implemented by the CPU 30 of the display control device 20 reading and executing the video image display program stored in the ROM 32 or the storage 36 (see FIG. 7).

The rearward image capture section 46 uses the rear camera 16 to capture moving images rearward from the vehicle 12. The rearward image capture section 46 outputs this rearward video image to the computation section 50.

Figure 3:
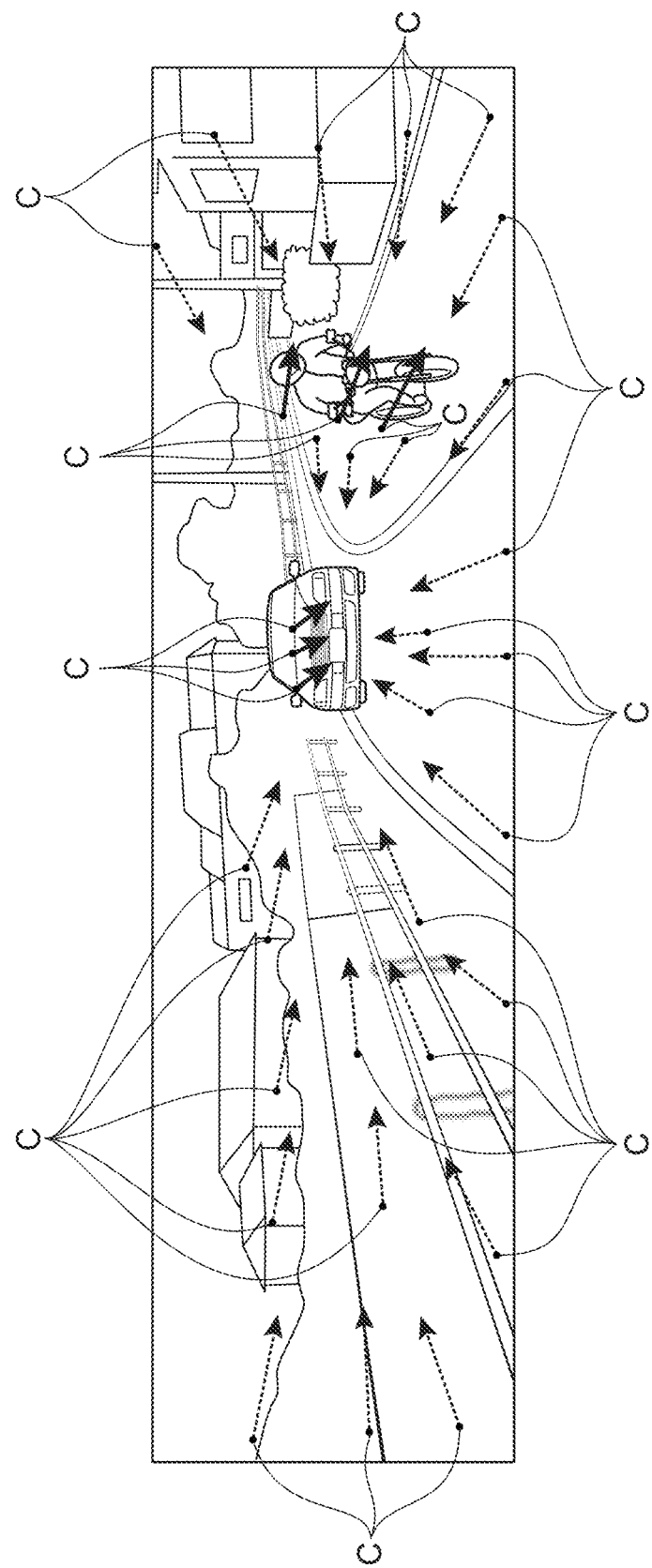
FIG. 3 is a schematic diagram illustrating video image processing by a vehicle electronic mirror system according to the first exemplary embodiment.
Figure 4:
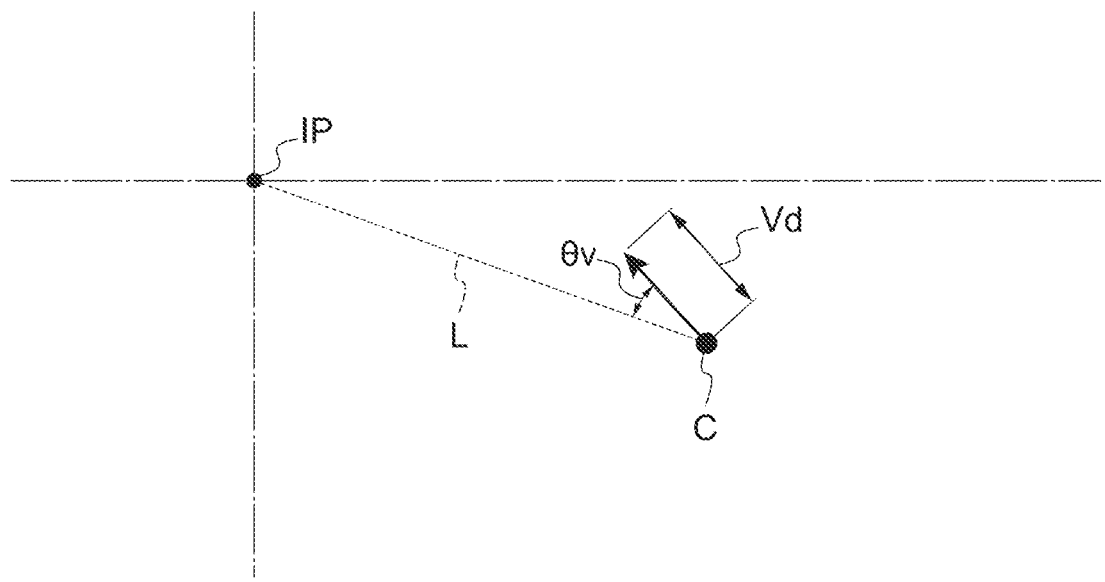
FIG. 4 is a graph illustrating an example of computation of an optical flow direction of a feature point during video image processing by a vehicle electronic mirror system according to the first exemplary embodiment.

The computation section 50 performs image analysis on the rearward video image to extract feature points C from the rearward video image (see FIG. 3). Note that as an example, the feature points C are locations of large changes in brightness. The computation section 50 also detects a movement destination of each of the extracted feature points C in a subsequent frame of the rearward video image. This processing is repeated in order to compute optical flows of the respective feature points C as illustrated in FIG. 3 (see the arrows in FIG. 3). The computation section 50 also computes optical flow directions and movement amounts of the respective feature points C, as illustrated in FIG. 4. More specifically, for each of the feature points C, the computation section 50 computes an angle θV formed between the optical flow and an imaginary line L connecting the feature point C to a point at infinity IP in the rearward video image, and a movement amount Vd per unit time of the optical flow itself. The computation section 50 then transmits the computed optical flow angles θV and movement amounts Vd of the respective feature points C to the determination section 52 illustrated in FIG. 8.

Figure 5:
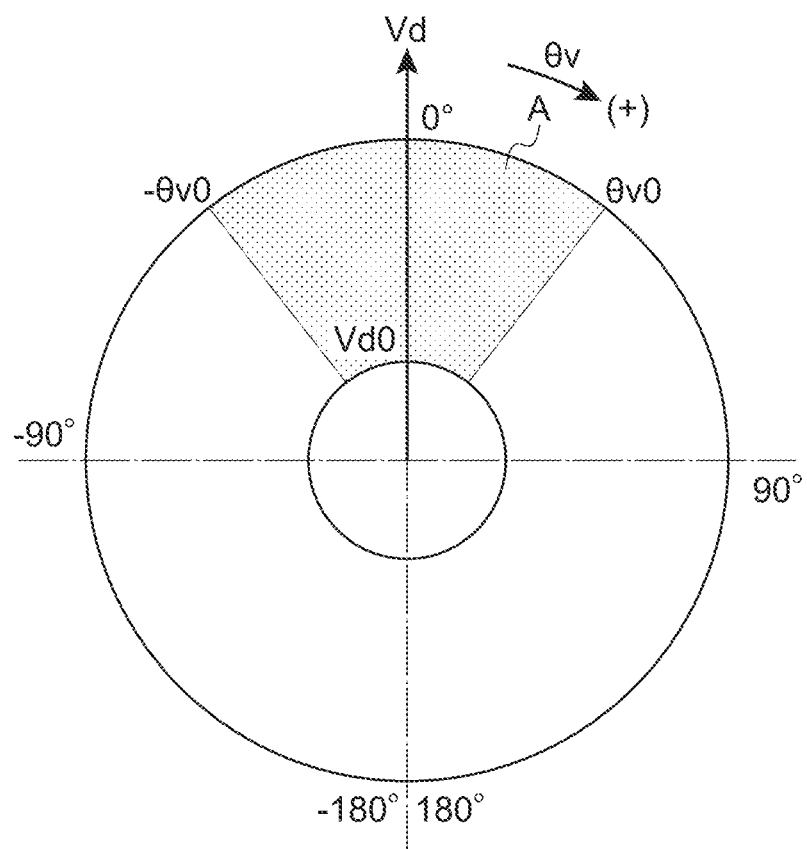
FIG. 5 is a graph schematically illustrating a low pass filter application range during video image processing by a vehicle electronic mirror system according to the first exemplary embodiment.

The determination section 52 determines whether or not the optical flow direction (angle θV) of each of the feature points C computed by the computation section 50 is headed toward the point at infinity IP side of the rearward video image. More specifically, as illustrated in FIG. 5, the determination section 52 determines whether or not the angle θV formed between the optical flow of the feature point C and the imaginary line L is within a low pass filter application region A. As an example, the low pass filter application region A is a range spanning from a predetermined angle θV0 to an angle −θV0 as referenced against an angle θV of 0°. Furthermore, the low pass filter application region A is a range where the movement amount Vd of the optical flow of the feature point C is a movement amount Vd0, this being a predetermined value, or greater. Note that as an example, the movement amount Vd0 is a movement amount at a level at which streaming of the optical flow is not distracting.

The determination section 52 determines whether or not the movement amount Vd of the optical flow for each of the feature points C is the predetermined movement amount Vd0 or greater. Namely, for each of the feature points C, the determination section 52 determines whether or not the angle θV and the movement amount Vd of the optical flow of the feature point C fall within the low pass filter application region A. The determination section 52 transmits its determination results to the processed video image generation section 48.

Figure 6:
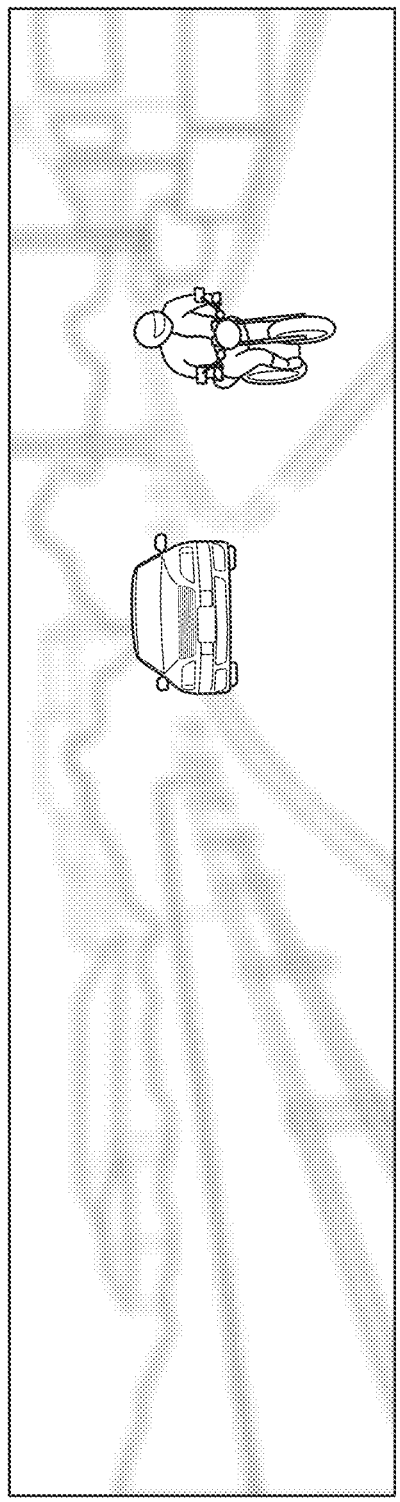
FIG. 6 is a schematic diagram illustrating an example of a display of a synthesized video image by a vehicle electronic mirror system according to the first exemplary embodiment.

Based on the results determined by the determination section 52, the processed video image generation section 48 illustrated in FIG. 8 performs video image processing to reduce the visibility of a region (hereafter simply referred to as a filter application region) corresponding to feature points C having an optical flow that falls into the low pass filter application region A in the rearward video image relative to the visibility of other regions. More specifically, the processed video image generation section 48 applies a low pass filter to cut spatial frequency components of 2 cycles per degree (cpd: difference in shading per unit angle) or greater from the filter application region. Accordingly, as illustrated in FIG. 6, a video image is produced in which the filter application region (as an example, a region other than the car and motorcycle behind in FIG. 6) is blurred relative to other regions (namely, the car and motorcycle behind).

The processed video image generation section 48 also changes the low pass filter application range and the spatial frequency components cut by the low pass filter in response to operation of the display adjustment switch 24. More specifically, when the display adjustment switch 24 is operated to lessen the application of the low pass filter, the range of the low pass filter application region A illustrated in FIG. 5 is made smaller, and the spatial frequency components cut in the filter application region are changed to 6 cpd or greater. Accordingly, the range over which display is blurred is made smaller, and the blur amount is also reduced. On the other hand, when the display adjustment switch 24 is operated to intensify the application of the low pass filter, the range of the low pass filter application region A is enlarged, and the spatial frequency components cut in the filter application region are changed to 2 cpd or greater. Accordingly, the range over which display is blurred is made larger, and the blur amount is also increased in comparison to cases in which operation is performed to lessen the low pass filter application. The processed video image generation section 48 transmits a processed video image that has been applied with the low pass filter as described above to the output section 54.

The output section 54 displays the processed video image processed by the processed video image generation section 48 on the electronic interior mirror 18. As an example, the video image illustrated in FIG. 6 is thereby displayed on the electronic interior mirror 18.

Next, explanation follows regarding operation of the first exemplary embodiment.

As illustrated in FIG. 8, in the present exemplary embodiment, the display control device 20 generates the processed video image based on the rearward video image captured rearward from the vehicle 12 by the rearward image capture section 46, and this processed video image is displayed toward the occupant by the electronic interior mirror 18. The display control device 20 includes the computation section 50, the determination section 52, and the processed video image generation section 48. Of these, the computation section 50 extracts the feature points C from the rearward video image and computes the optical flow direction of each of the feature points C (see FIG. 3). The determination section 52 determines whether or not the optical flow direction of each of the feature points C computed by the computation section 50 is heading toward the point at infinity IP (see FIG. 4) side of the rearward video image. The processed video image generation section 48 generates a processed video image (see FIG. 6) in which regions in the rearward video image corresponding to feature points C determined by the determination section 52 to be heading toward the point at infinity IP side have reduced visibility relative to the visibility of other regions. Namely, regions corresponding to feature points C having an optical flow heading toward the point at infinity IP side are moving away from the vehicle 12. On the other hand, regions corresponding to feature points C other than the feature points C having an optical flow heading toward the point at infinity IP side are following or approaching the vehicle 12. Namely, regions corresponding to feature points having an optical flow heading toward the point at infinity IP side require less attention than the other regions, and so have a low display priority level. Reducing the visibility of the regions corresponding to feature points C having an optical flow heading toward the point at infinity IP side relative to the visibility of the other regions makes the streaming of the optical flow in a range having a low display priority level less noticeable, thereby enabling annoyance felt when looking at the electronic interior mirror 18 to be alleviated. This may enable both an increase in the range that can be seen by the occupant and alleviation of the burden on the occupant when looking to be achieved.

The display control device 20 generates the processed video image in which the visibility of regions in the rearward video image corresponding to feature points C determined by the determination section 52 to have an optical flow direction heading toward the point at infinity IP side and to have a movement amount Vd of the optical flow per unit time of the predetermined value or greater is reduced relative to the visibility of other regions. Accordingly, the visibility is not lowered for regions corresponding to feature points C having an optical flow with a movement amount Vd less than the movement amount Vd0 (see FIG. 5). Namely, in cases in which the movement amount Vd of the optical flow is less than the movement amount Vd0, since the streaming of the optical flow is comparatively slow, the streaming of the optical flow is unlikely to be distracting. Namely, regions where the movement amount Vd of the optical flow is less than the movement amount Vd0 are unlikely to annoy the occupant when looking. Accordingly, a clear video image is displayed without reduced visibility for such regions that are unlikely to annoy the occupant when looking at the video image. This may improve the visibility.

The display control device 20 makes the spatial frequency of regions in the rearward video image corresponding to feature points C determined by the determination section 52 to be heading toward the point at infinity IP side a lower spatial frequency relative to the spatial frequency of other regions, such that the regions in the rearward video image corresponding to the feature points C determined to be heading toward the point at infinity IP side appear as a blurred video image, as illustrated in FIG. 6. The streaming of the optical flow is thus made less noticeable, enabling annoyance felt when looking at the electronic interior mirror 18 to be alleviated. This may enable both an increase in the range that can be seen by the occupant and alleviation of the burden on the occupant when looking to be more substantially achieved.

Moreover, in response to operation of the display adjustment switch 24, the display control device 20 changes the level of the reduction when reducing the visibility of regions in the rearward video image corresponding to feature points C to be heading toward the point at infinity IP side relative to the visibility of other regions. This may enable an appropriate display adapted to differences in what occupants find annoying. Further, this may enable the burden on the occupant when looking to be further alleviated.

Modified Example

In the first exemplary embodiment described above, the visibility of the filter application regions in the rearward video image is lowered relative to the visibility of other regions. However, there is no limitation thereto, and as a modified example, regions other than the filter application regions in the rearward video image may be displayed with emphasis. Examples of display with emphasis include changing the contrast, changing the brightness, adding a flashing effect, or displaying a frame around ranges other than the filter application regions in the video image. Displaying regions other than the filter application regions in the rearward video image with emphasis means that regions where the vehicle 12 is being followed or approached are displayed with emphasis relative to other regions, thereby making to easier for the occupant to look at regions with a high display priority level that require more attention. This may facilitate the acquisition of necessary information by the occupant. Note that configuration may be made such that the visibility of the filter application regions in the rearward video image is reduced relative to the visibility of other regions in addition to displaying ranges other than the filter application regions with emphasis, or configuration may be made such that the regions other than the filter application regions are simply displayed with emphasis.

Second Exemplary Embodiment

Figure 9:
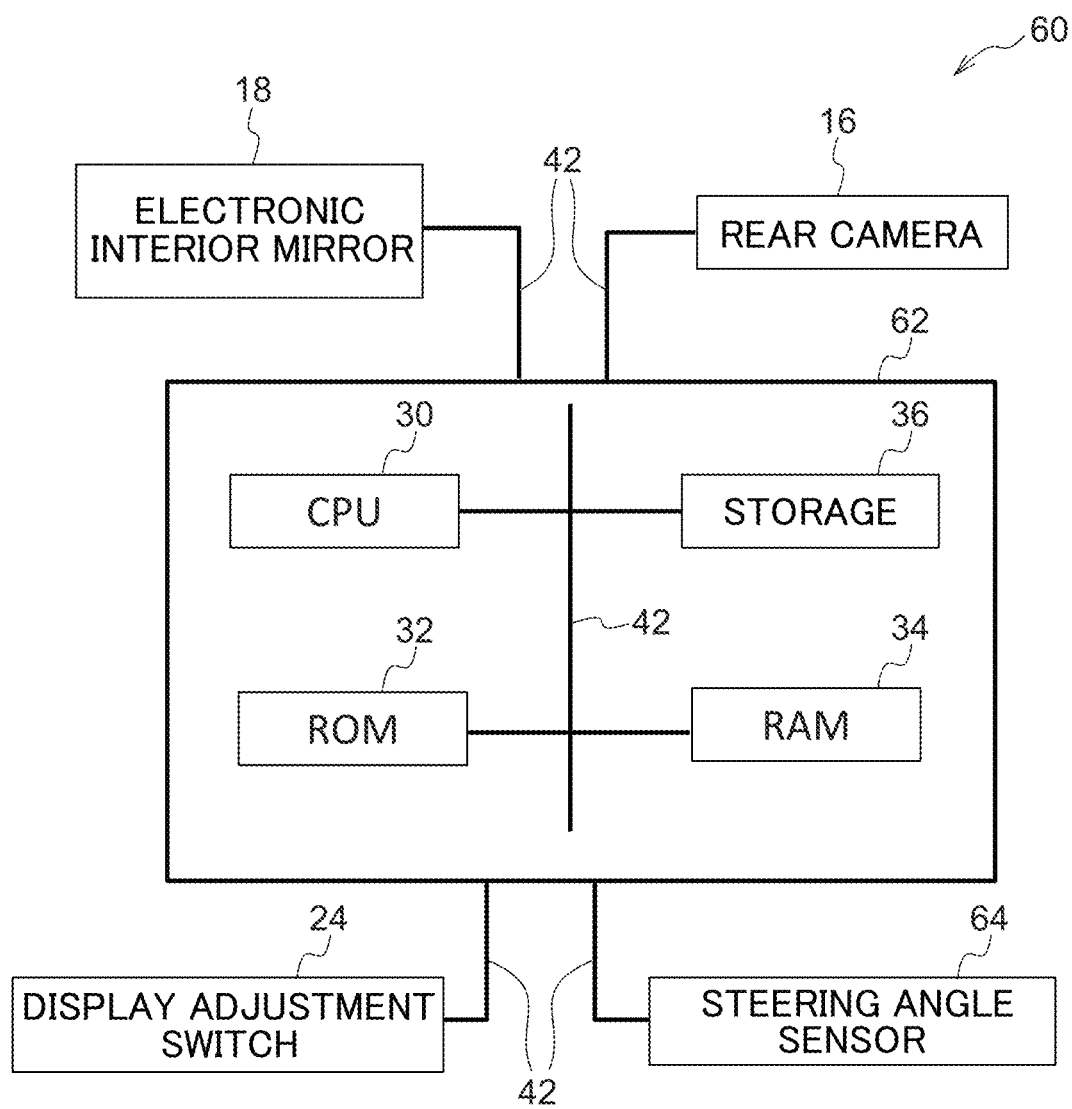
FIG. 9 is a block diagram illustrating hardware configuration of a vehicle electronic mirror system according to a second exemplary embodiment.
Figure 10:
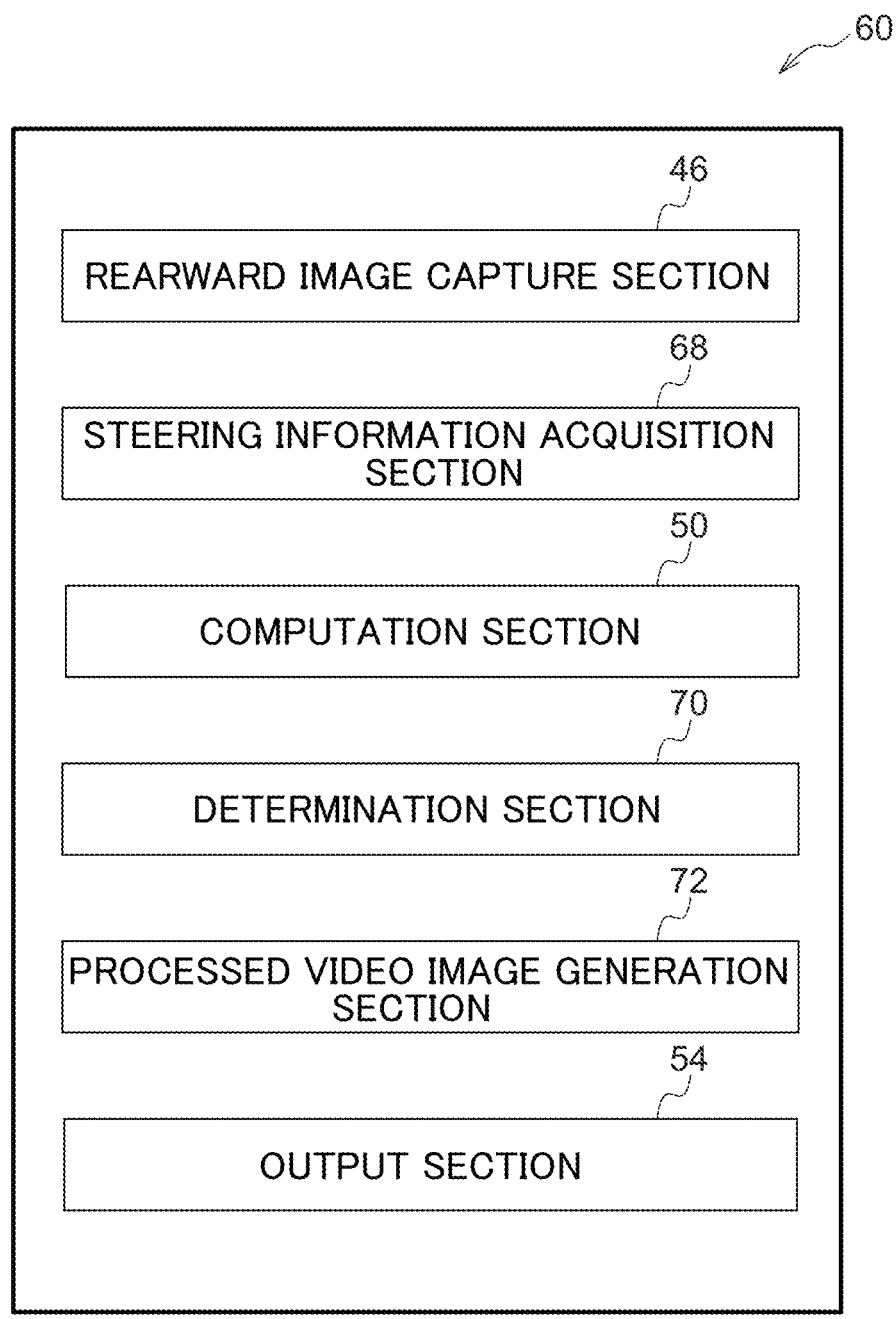
FIG. 10 is a block diagram illustrating functional configuration of a vehicle electronic mirror system according to the second exemplary embodiment.
Figure 11:
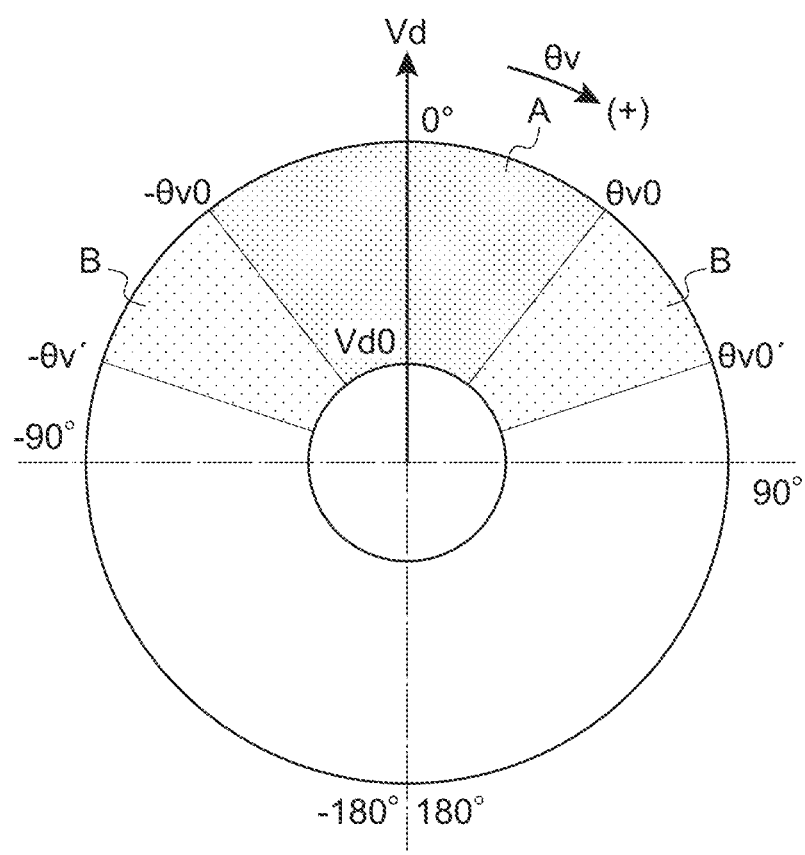
FIG. 11 is a graph schematically illustrating a low pass filter application range during video image processing by a vehicle electronic mirror system according to the second exemplary embodiment.

Next, explanation follows regarding a vehicle electronic mirror system according to a second exemplary embodiment of the present disclosure, with reference to FIG. 9 to FIG. 11. Note that configuration sections that are the same as those of the first exemplary embodiment and so on described above are allocated the same reference numerals, and explanation thereof is omitted.

A vehicle electronic mirror system 60 according to the second exemplary embodiment has the same basic configuration as that of the first exemplary embodiment, but with a feature that application of the low pass filter is determined based on steering angle information.

Namely, as illustrated in FIG. 9, the vehicle electronic mirror system 60 includes the rear camera 16 installed in the vehicle 12, the electronic interior mirror 18, a display control device 62 serving as a video image processing section, and a steering angle sensor 64.

The steering angle sensor 64 is provided in the vicinity of a steering wheel 66 (see FIG. 1), and is connected to the display control device 62 so as to communicate with each other. The steering angle sensor 64 is a sensor for detecting a steering angle of the steering wheel 66, and outputs information (a signal) corresponding to the steering angle of the steering wheel 66 to the display control device 62.

During execution of the video image display program mentioned above, the vehicle electronic mirror system 60 employs the hardware resources mentioned above to implement various functionality. Explanation follows regarding the functional configuration implemented by the vehicle electronic mirror system 60.

FIG. 10 is a block diagram illustrating an example of the functional configuration of the vehicle electronic mirror system 60.

As illustrated in FIG. 10, the functional configuration of the vehicle electronic mirror system 60 includes the rearward image capture section 46, a steering information acquisition section 68, the computation section 50, a determination section 70, a processed video image generation section 72, and the output section 54. The respective functional configuration is implemented by the CPU 30 of the display control device 62 reading and executing the video image display program stored in the ROM 32 or the storage 36 (see FIG. 9).

The steering information acquisition section 68 acquires steering angle information regarding the steering wheel 66 of the vehicle itself 12 from the steering angle sensor 64, and outputs this steering angle information to the determination section 70.

The determination section 70 determines whether or not the optical flow direction of each of the feature points C computed by the computation section 50 is headed toward the point-at-infinity side in the rearward video image. Specifically, as illustrated in FIG. 11, the determination section 70 determines whether or not the angle θV formed between the optical flow of the feature point C and the imaginary line L falls within the low pass filter application region A.

The determination section 70 also determines whether or not the optical flow orientation of each of the feature points C is consistent with steering of the vehicle 12, based on the steering angle information received from the steering information acquisition section 68. More specifically, even if the angle θV formed between the optical flow of the feature point C and the imaginary line L is outside the low pass filter application region A, in cases in which the angle θV substantially matches a direction in which the scenery moves as it changes when the vehicle 12 is steered, the determination section 70 determines that the angle θV falls within a low pass filter application region B. As an example, the low pass filter application region B is a range spanning between the angle θV0 of the low pass filter application region A and an angle θv0' formed between the optical flow of the feature point C in the rearward video image and the imaginary line L when the steering wheel 66 is at its maximum steering angle toward one side in a left-right direction, and also a range spanning from the angle −θV0 of the low pass filter application region A and an angle −θv0' formed between the optical flow of the feature point C in the rearward video image and the imaginary line L when the steering wheel 66 is at its maximum steering angle toward the other side in the left-right direction.

The determination section 70 determines whether or not the movement amount Vd of the optical flow of each of the feature points C computed by the computation section 50 is the predetermined movement amount Vd0 or greater. Namely, for each of the feature points C, the determination section 70 determines whether or not the angle θV and the movement amount Vd of the optical flow of the feature point C falls within the low pass filter application region A or the low pass filter application region B. The determination section 70 transmits the result of this determination to the processed video image generation section 72.

Based on the results determined by the determination section 70, the processed video image generation section 72 performs video image processing to reduce the visibility of regions (hereafter, simply "enlarged filter application regions") corresponding to feature points C having an optical flow that fall into the low pass filter application region A or the low pass filter application region B in the rearward video image captured by the rearward image capture section 46 relative to the visibility of other regions. More specifically, the processed video image generation section 72 applies a low pass filter to cut spatial frequency components of 2 cpd or greater from the enlarged filter application regions. The video image in the enlarged filter application regions is therefore blurred relative to other regions (see FIG. 6).

The processed video image generation section 72 also changes the low pass filter application range and the spatial frequency components cut by the low pass filter in response to operation of the display adjustment switch 24. More specifically, when the display adjustment switch 24 is operated to lessen the application of the low pass filter, the ranges of the low pass filter application region A and the low pass filter application region B illustrated in FIG. 11 are made smaller, and the spatial frequency components cut in the enlarged filter application region are changed to 6 cpd or greater. Accordingly, the range over which display is blurred is made smaller, and the blur amount is also reduced. On the other hand, when the display adjustment switch 24 is operated to intensify the application of the low pass filter, the ranges of the low pass filter application region A and the low pass filter application region B are enlarged, and the spatial frequency components cut in the enlarged filter application region are changed to 2 cpd or greater. Accordingly, the range over which display is blurred is made larger, and the blur amount is also increased in comparison to cases in which operation is performed to lessen the low pass filter application. The processed video image generation section 72 transmits a processed video image that has been applied with the low pass filter as described above to the output section 54.

Next, explanation follows regarding operation of the second exemplary embodiment.

The configuration described above is similar to the configuration of the vehicle electronic mirror system 10 of the first exemplary embodiment with the exception of the point that application of the low pass filter is determined based on the steering angle information, and therefore obtains similar advantageous effects to those of the first exemplary embodiment. The display control device 20 also generates a processed video image in which the visibility of regions in the rearward video image corresponding to feature points C that the determination section 70 has determined to have an optical flow direction that is consistent with steering of the vehicle 12 is reduced relative to the visibility of other regions, enabling the streaming of the optical flow in regions corresponding to feature points C having an optical flow direction heading in a direction other than toward the point at infinity IP side as a result of steering to be made less noticeable. Namely, feature points C having an optical flow direction heading in a direction other than toward the point at infinity IP side, but that are heading in this direction other than toward the point at infinity IP side as a result of steering, are likely to be moving away from the vehicle itself 12, and so have a low display priority level since less attention is required in such cases. Reducing the visibility of such regions enables regions in which the streaming of the optical flow is less noticeable to be made larger, thereby enabling the annoyance felt when looking at the electronic interior mirror 18 to be further alleviated. This may enable the burden on the occupant when looking to be further alleviated.

Note that in the first and second exemplary embodiments described above, when the display adjustment switch 24 is operated to lessen the application of the low pass filter, the ranges of the low pass filter application region A and the low pass filter application region B are made smaller, and the spatial frequency components cut from the filter application region or the enlarged filter application region are changed to 6 cpd or greater. However, there is no limitation thereto, and configuration may be made such that only the ranges of the low pass filter application region A and the low pass filter application region B are made smaller, or such that only the spatial frequency components cut from the filter application region or the enlarged filter application region are set to 6 cpd or greater. Moreover, although the spatial frequency components cut from the filter application region or the enlarged filter application region are 6 cpd or greater, there is no limitation thereto, and configuration may be made such that spatial frequency components of another value or greater are cut therefrom.

Moreover, when the display adjustment switch 24 is operated so as to intensify the application of the low pass filter, the ranges of the low pass filter application region A and the low pass filter application region B are made larger, and the spatial frequency components cut from the filter application region or the enlarged filter application region are changed to 2 cpd or greater. However, there is no limitation thereto, and configuration may be made such that only the ranges of the low pass filter application region A and the low pass filter application region B are made larger, or such that only the spatial frequency components cut from the filter application region or the enlarged filter application region are set to 2 cpd or greater. Moreover, although the spatial frequency components cut from the filter application region or the enlarged filter application region are 2 cpd or greater, there is no limitation thereto, and configuration may be made such that spatial frequency components of another value or greater are cut therefrom.

Moreover, the rearward image capture section 46 captures images rearward from the vehicle 12 using the rear camera 16. However, there is no limitation thereto, and video images from a pair of left and right exterior cameras respectively provided to side doors and configured to capture images rearward from the vehicle may be merged with a video image from the rear camera 16 for broader image capture rearward from the vehicle 12.

Although explanation has been given regarding exemplary embodiments of the present disclosure, the present disclosure is not limited by the above explanation, and obviously various modifications may be implemented within a range not departing from the spirit of the present disclosure.

What is claimed is:

1. A vehicle electronic mirror system comprising:
    a rearward camera that captures a rearward video image from a vehicle;
    a display that displays the rearward video image toward an occupant; and
    a processor coupled to the rearward camera and the display, the processor being configured to:
        extract a feature point in the rearward video image and compute an optical flow direction of the feature point,
        determine whether or not the optical flow direction of the feature point is heading toward a point-at-infinity side in the rearward video image, and
        generate a processed video image in which visibility of a region in the rearward video image corresponding to a feature point heading toward the point-at-infinity side is reduced relative to a visibility of other regions in the rearward video image; and
        display the processed video image toward the occupant.

2. The vehicle electronic mirror system of claim 1, wherein the processor is configured to:
    compute a movement amount per unit time of an optical flow of the feature point;
    determine whether or not the movement amount is a predetermined value or greater; and
    generate the processed video image, in which the visibility of a region in the rearward video image that corresponds to a feature point heading toward the point-at-infinity side, and that is determined to have a movement amount of the predetermined value or greater, is reduced relative to the visibility of other regions in the rearward video image.

3. The vehicle electronic mirror system of claim 1, wherein the processor is configured to display a region in the rearward video image corresponding to a feature point other than the feature point heading toward the point-at-infinity side with emphasis relative to other regions in the rearward video image.

4. The vehicle electronic mirror system of claim 1, wherein the processor is configured to make a spatial frequency of the region in the rearward video image corresponding to the feature point heading toward the point-at-infinity side a lower spatial frequency relative to the spatial frequency of the other regions in the rearward video image.

5. The vehicle electronic mirror system of claim 1, wherein the processor is configured to:
    acquire steering angle information of the vehicle;
    determine whether or not the optical flow direction of the feature point is consistent with steering of the vehicle based on the steering angle information; and
    generate the processed video image, in which visibility of a region in the rearward video image corresponding to the feature point having an optical flow direction consistent with the steering of the vehicle is reduced relative to visibility of other regions.

6. The vehicle electronic mirror system of claim 1, wherein, in response to operation of an operation section, the processor changes a degree of reduction by which the visibility of the region in the rearward video image corresponding to the feature point heading toward the point-at-infinity side is reduced relative to the visibility of the other regions.

* * * * *